US006971204B1

(12) United States Patent
Gibney

(10) Patent No.: US 6,971,204 B1
(45) Date of Patent: Dec. 6, 2005

(54) FLOWER POT BALUSTER BRACKET

(76) Inventor: James Gibney, 28 Sagamore Rd., Stanhope, NJ (US) 07874

(*) Notice: Subject to any disclaimer, the term of this patent is extended or adjusted under 35 U.S.C. 154(b) by 0 days.

(21) Appl. No.: 10/945,984

(22) Filed: Sep. 22, 2004

(51) Int. Cl.[7] .............................................. A01G 9/02
(52) U.S. Cl. ........................................................ 47/39
(58) Field of Search ............................ 47/39, 40, 41.1, 47/44, 45–47; 211/85.23, 85.31, 112; 248/27.8, 248/112, 302

(56) References Cited

U.S. PATENT DOCUMENTS 1,337,803 A * 4/1920 Stanley .......................... 47/47
2,009,668 A * 7/1935 Lay ............................... 47/47
2,242,168 A * 5/1941 Bergman ....................... 47/47
3,272,467 A 9/1966 Kassube
3,302,328 A * 2/1967 King ............................. 47/47
3,381,824 A * 5/1968 Blumenschein .............. 211/68
3,559,939 A * 2/1971 Luna .......................... 248/210
4,503,636 A * 3/1985 Stuckey ......................... 47/44
5,556,068 A * 9/1996 Gorelik ................. 248/220.41
6,209,837 B1 4/2001 Harms

FOREIGN PATENT DOCUMENTS

WO WO95/14372 * 6/1995 ............ A01G 9/12

* cited by examiner

*Primary Examiner*—Son T. Nguyen
(74) *Attorney, Agent, or Firm*—Thomas J. Germinario

(57) ABSTRACT

The present invention is directed to a detachable bracket suitable for horizontally supporting a potted plant from a vertical baluster of the type found on outdoor decks and stairways. The potted plant is supported by a cantilever arm which connects to four mutually perpendicular arms which engage all four faces of the baluster. The five arms of the bracket define three planes, and the angles between these planes enable the horizontal orientation of the mounted bracket and secure engagement of the bracket's locking arm with the side of the baluster. The bracket is mounted by orienting the locking arm vertically such that the bracket affords an aperture just wide enough to accommodate the baluster. The front of the bracket is then lowered into a horizontal position in which it can support a potted plant in an upright position. The bracket can be detached from the baluster by reversing this procedure.

7 Claims, 4 Drawing Sheets

FLOWER POT BALUSTER BRACKET

BACKGROUND OF THE INVENTION

Outdoor decks and stairways are desirable locations for potted plants, because they are exposed to ample sunlight, air and rain. Potted plants also help to make outdoor decks and stairways more attractive. Placing potted plants on the floor of a deck causes unsightly clutter, however, and it's not safe to put plants on the steps of a stairway. Therefore, the vertical balusters of a deck or stairway afford ideal locations for potted plants, provided there is a suitable means for supporting the pots. Plant hangers which utilize fasteners such as screws or nails are not optimal for balusters, which are not designed to withstand the sheer stress of a load-bearing screw or nail and are prone to splitting. Since balusters are designed to bear a load distributed along their horizontal cross-section, a horizontally-disposed bracket is well suited for suspending any kind of load from a baluster.

Ideally, such a bracket should readily detachable and adjustable, in order to take advantage of the multiple locations and hanging heights available on balusters. Since potted plants will typically be hung from the outside of the baluster, where they may be rather inaccessible, it is often more convenient to be able to detach the bracket before watering, fertilizing or pruning the plant. The detachable bracket is also useful during change of seasons or unsettled weather, where it may be necessary to bring potted plants indoors temporarily.

Another desirable feature of such a bracket is the ability to support a flower pot in an upright position without the need for the pot to be equipped with its own hook or hanger. Hanging flower pots are better suited to be suspended from screw-in eyelets or hooks under the eaves of a house or beneath a deck. The ability to hang plants in ordinary pots gives the homeowner more options in terms of rotating different plants in various locations—for aesthetic variety and to adjust for seasonal changes in sunlight.

None of the existing art in the field of brackets for hanging potted plants provides all three of the desirable features identified hereinabove: (i) suitability for suspension from a baluster, (ii) ready detachability and adjustability, and (iii) upright support for pots without built-in hangers. Flower pot brackets of the kind disclosed in McGain, U.S. Pat. No. Des. 271,831, Emalfarb et al., U.S. Pat. No. 5,390,443, Hopkins, U.S. Pat. No. 5,743,044, and Dwyer, U.S. Pat. No. 6,752,279 B1 are simply not adaptable to hanging from a vertical baluster. Neither are brackets designed for other applications, such Luna, U.S. Pat. No. 3,559,939 (paint can holder), and Loucks, U.S. Pat. No. 3,669,394 (general purpose bracket).

While Harms, U.S. Pat. No. 6,209,837 B1 discloses a hanging plant bracket which meets the first two criteria—being designed for suspension from a baluster and readily detachable and adjustable—it provides an upward diagonal support arm and is therefore only suitable for suspending pots with built-in hangers. Similarly, Kassube, U.S. Pat. No. 3,272,467, disclosing a bracket for suspending a pail from the vertical rail of a ladder, is adaptable to a vertical baluster, but provides a downward diagonal support arm not suitable for suspending a potted plant. Therefore, the need for a detachable baluster bracket that provides upright support for ordinary flower pots remains unaddressed in the existing art.

SUMMARY OF THE INVENTION

The present invention is directed to a detachable bracket suitable for horizontally supporting a potted plant from a vertical baluster of the type typically found on outdoor decks and stairways. The bracket comprises a cantilever arm that has a support extending from its outward end. In the preferred embodiment, the support has an open ring shape with a diameter slightly less than that of the rim of the flower pot to be held. From its inward end the cantilever arm extends through a perpendicular bend to a front arm, which is disposed along the same horizontal plane as the cantilever arm and the support ring. When the bracket is mounted on the baluster, the front arm engages the front face of the baluster across its entire width. In the preferred embodiment, the front arm is slightly longer than the width of the baluster.

The front arm is the first of four mutually perpendicular arms that surround the four faces of the baluster. The front arm extends through a perpendicular bend to a side arm, which is disposed at an acute angle to the horizontal plane defined by the cantilever arm and the front arm. The proper angular orientation of the side arm allows the bracket, when mounted on the baluster, to provide a horizontal support for the flower pot. Optimally, the specific angular orientation of the side arm is determined by the ratio of its length to the baluster width. When the bracket is mounted on the baluster, the side arm engages one of the side faces of the baluster along its entire width. In the preferred embodiment, the side arm is slightly longer than the front arm.

Extending through a perpendicular bend at the end of the side arm is a back arm, which is disposed along the same plane as the front arm and the side arm. Thus, the plane defined by the front, side and back arms is disposed at an acute angle to the plane defined by the cantilever and front arms. When the bracket it mounted on the baluster, the plane of the cantilever and front arms is horizontal, while the plane of the front, side and back arms is inclined upward at an acute angle optimally determined by the ratio of the length of the side arm to the baluster width. While the side arm traverses the side face of the baluster diagonally, however, the back arm traverses the back face of the baluster horizontally, parallel to the front arm, but elevated above it by a distance equal to the product of the length of the side arm and the sine of the angle between the first two planes of the bracket. In the preferred embodiment, the back arm is shorter than either the front or side arms, and its length, measured along its interior side, is equal to the width of the baluster.

A locking arm extends through an upward perpendicular bend from the end of the back arm. The plane defined by the back arm and the locking arm is oriented at an acute angle to the plane defined by the front, side and back arms. Optimally, this angle is the complement of the angle between the first two planes of the bracket, thus assuring that the opening between the locking arm and the front arm is just wide enough to accommodate the baluster when the locking arm is vertically oriented. When the bracket is mounted on the baluster, the locking arm diagonally traverses part of the remaining side face of the baluster. In the preferred embodiment, the locking arm has an obtuse inward bend in its midsection, which engages the side of the baluster snugly. In this configuration, the free end of the locking arm extends outward away from the side of the baluster, so that it may be grasped when the user wishes to adjust the hanging height of the bracket.

The bracket is mounted on the baluster by tilting it upward so that the locking arm is vertically oriented. The bracket is placed on the baluster such that the front, side and back arms engage three faces of the baluster and the locking arm is vertically aligned along the back edge of the remaining face. The bracket is then tilted downward until the support is horizontally oriented, and the locking arm snugly engages the side face of baluster. When a potted plant is placed in the support, the distribution of the load through the cantilever arm, combined with the frictional force of the other four arms of the bracket engaging the four faces of the baluster, holds the support securely in the horizontal position.

Thus, the present invention provides a simple and economical design that fulfills the need for a detachable and adjustable bracket capable of horizontally supporting a basic flower pot without a built in hanger from a deck or stairway baluster.

DESCRIPTION OF THE INVENTION

Figure 1:
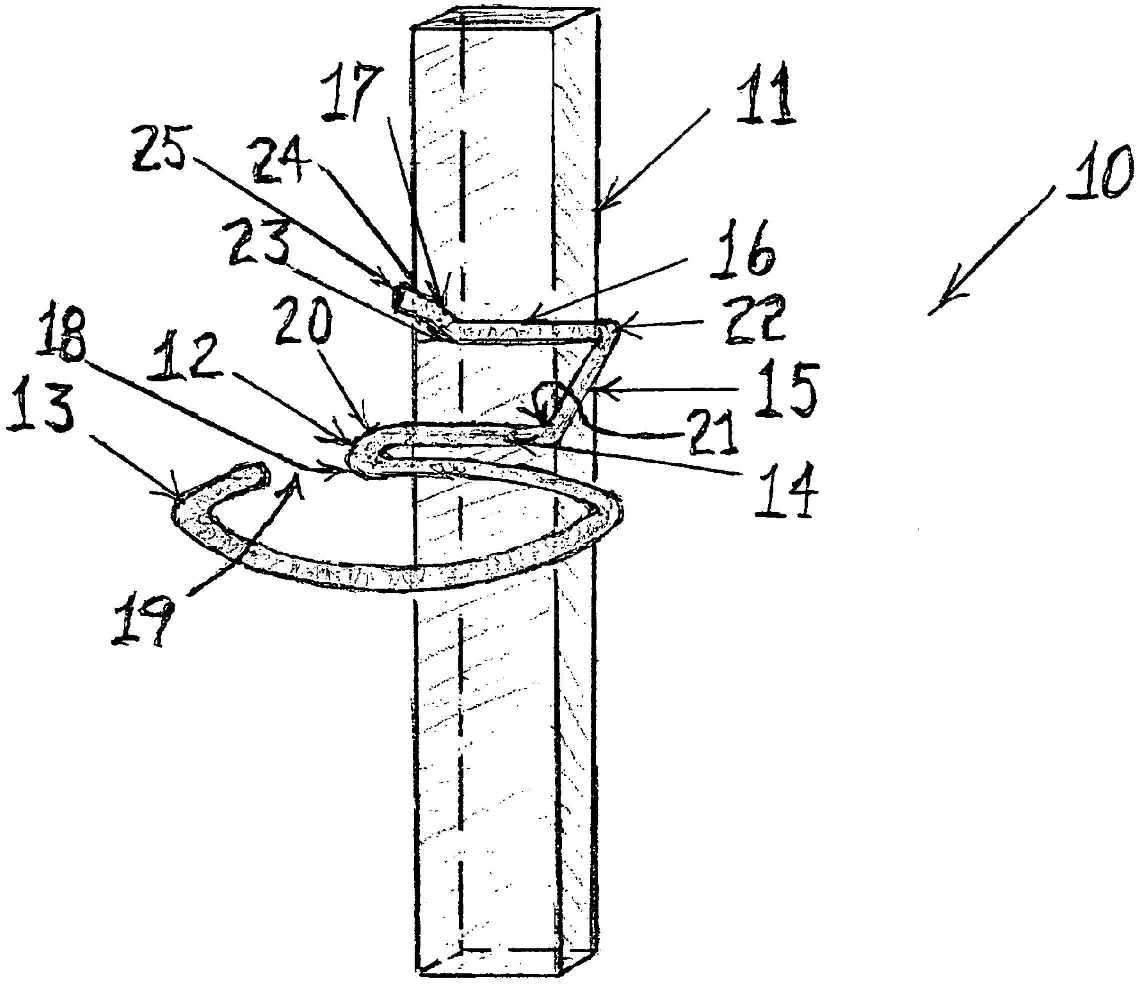
FIG. 1 is a front perspective view of the bracket mounted on the baluster with the baluster in ghost view.
Figure 2:
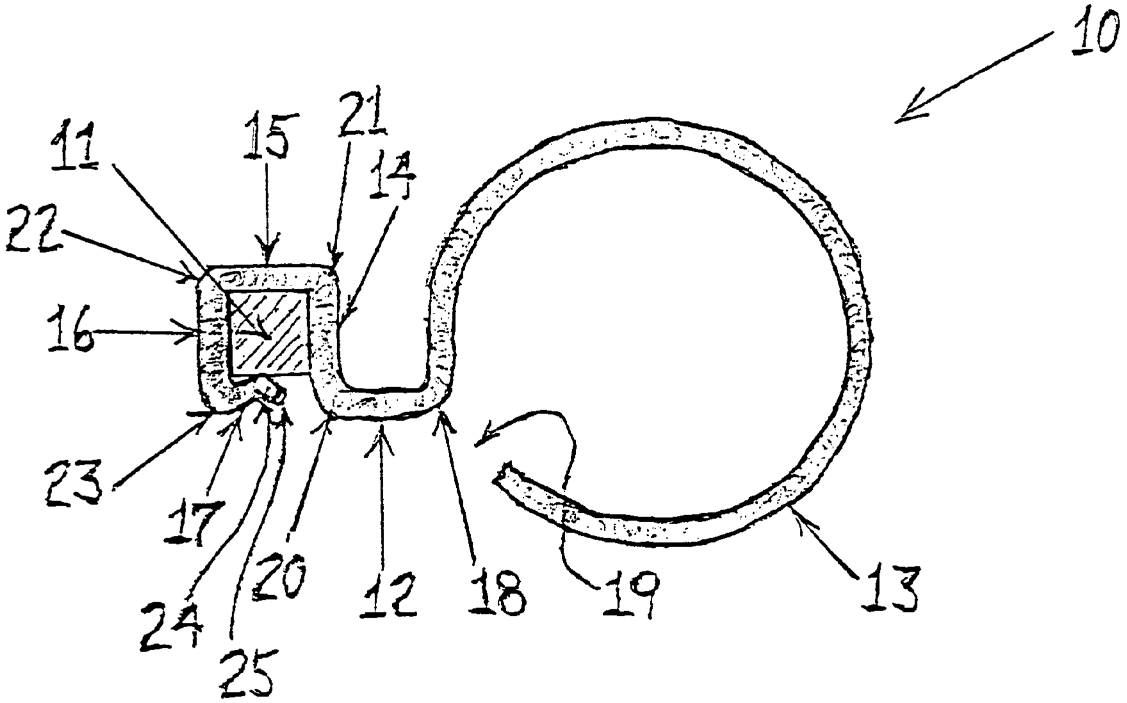
FIG. 2 is a top plan view of the bracket mounted on the baluster with the baluster in ghost view.

As shown in FIGS. 1 and 2, a bracket embodying the features of the present invention 10, which is suitable for horizontally supporting a potted plant (not shown) from a vertical baluster 11, comprises a cantilever arm 12 that extends horizontally outward from the baluster 11 when mounted thereon. The length of the cantilever arm, which determines the projection of the potted plant (not shown) outward from the baluster, is optimally less than six inches.

A support 13 extending from the outward end of the cantilever arm 12 is horizontally oriented when the bracket 10 is mounted on the baluster 11, so that it can support a flower pot (not shown) in an upright position. In the preferred embodiment, the support 13 has the shape of an open ring with a diameter slightly less than that of the rim of the flower pot (not shown) to be held. The ring support 13 extends from the outward end of the cantilever arm 12 through a first perpendicular bend 18. The opening 19 of the ring support 13 allows the ring to expand slightly to accommodate the flower pot (not shown) and to fit snugly around its rim. Optimally, the centerline of the ring support 13 is aligned with the centerline of the bracket 10 so that the flower pot (not shown) will be centered with respect to the vertical axis of the baluster 11.

A front arm 14 extends from the inward end of the cantilever arm 12 through a second perpendicular bend 20. The front arm is the first of four mutually perpendicular arms (14–17) that surround the four faces of the baluster 11 when the bracket 10 is mounted thereon. When the bracket 10 is mounted on the baluster 11, the front arm 14 is horizontally oriented and engages the front face of the baluster 11 across its entire width. In the preferred embodiment, the front arm 14 is slightly longer than the width of the baluster.

Figure 3:
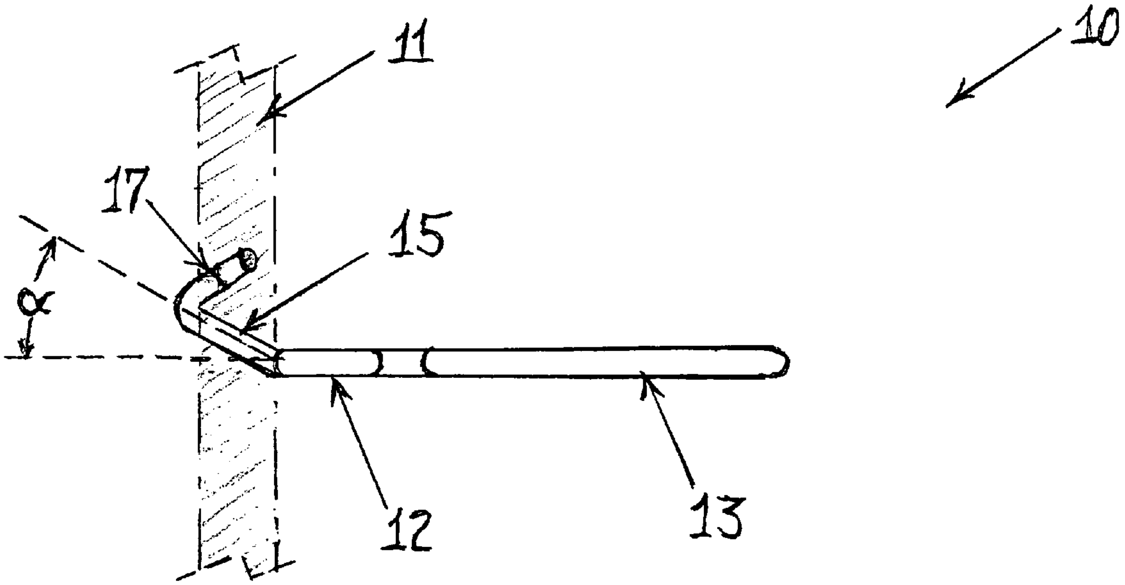
FIG. 3 is a side elevation view of the bracket mounted on the baluster with the baluster in ghost view.

A side arm 15 extends from the end of the front arm 14 through a third perpendicular bend 21. As shown in FIG. 3, the side arm is disposed at an acute angle a to the plane defined by the cantilever arm and the front arm. In the preferred embodiment, the angle a is optimized to enable the truest horizontal orientation of the support 13 when the bracket 10 is mounted on the baluster 11. The optimal angle a is equal to the arccosine of the quotient of the width of the baluster 11 divided by the length of the side arm 15. When the bracket 10 is mounted on the baluster 11, as depicted in FIG. 3, the side arm 15 is oriented diagonally upward at the angle a with respect to the horizontal and engages one of the side faces of the baluster 11 along its entire width. In the preferred embodiment, the side arm 15 is slightly longer than the front arm 14.

A back arm 16 extends from the end of the side arm 15 through a fourth perpendicular bend 22. The back arm 16 is disposed along the plane determined by the front arm 14 and the side arm 15. Thus, the first plane of the bracket 10, which is determined by the cantilever arm 12 and the front arm 14, is disposed at the acute angle $\alpha$ with respect to the second plane of the bracket 10, which is determined by the side arm 15 and the back arm 16. The front arm 14 lies in both the first plane and the second plane of the bracket 10 and thus forms the interface of the two planes. As shown in FIG. 1, when the bracket 10 is mounted on the baluster 11, the back arm 16 is horizontally oriented and engages the back face of the baluster 11 along its entire width. The mounted position of the back arm 16 is parallel to that of the front arm 14, but is offset above it by a distance equal to the product of the length of the side arm 15 and the sine of the angle $\alpha$. In the preferred embodiment, the back arm 16 is shorter than either the front arm 14 or the side arm 15, and its length, measured along its interior side, (as depicted in FIG. 2) is equal to the width of the baluster 11.

Figure 4:
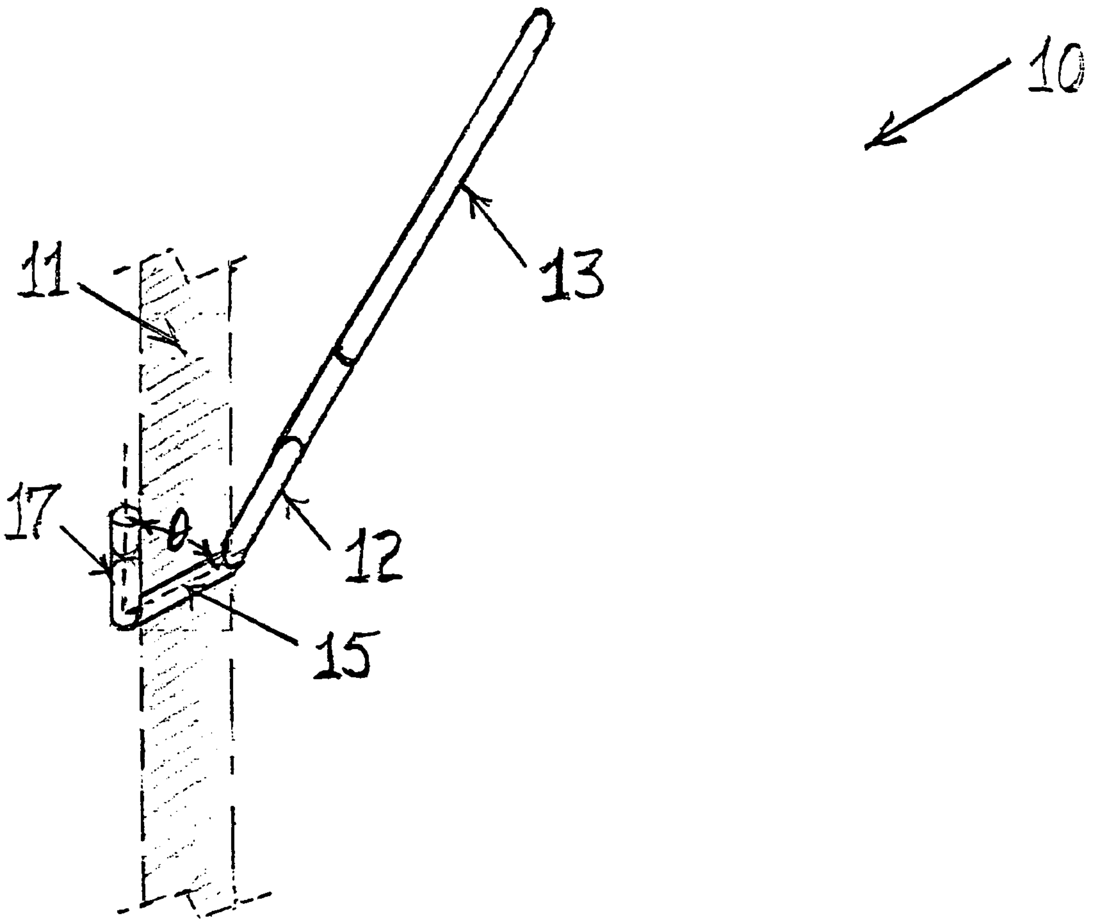
FIG. 4 is side elevation view of the bracket in position to be mounted on the baluster with the baluster in ghost view.

A locking arm 17 extends from the end of the back arm 16 through a fifth perpendicular bend 23. The back arm 16 and the locking arm 17 determine a third plane of the bracket 10. As shown in FIG. 4, the third plane of the bracket 10 is oriented at an acute angle $\theta$ with respect to the second plane of the bracket 10 (i.e., the plane determined by the side arm 15 and the back arm 16). The back arm 16 lies in both the second plane and the third plane of the bracket 10 and thus forms the interface between the two planes.

In the preferred embodiment, the angle $\alpha$ is less than 45°, and the angle $\theta$ is optimized so that the opening between the locking arm 17 and the front arm 14 is just wide enough to accommodate the baluster 11 when the locking arm 17 is vertically oriented (as shown in FIG. 4). This optimization of the angle $\theta$ enables the bracket 10 to be mounted on the baluster 11 while also affording the maximum engagement of the locking arm 17 with the side face of the baluster 11 when the bracket 10 is mounted in the horizontal position (as shown in FIG. 3). The optimal angle $\theta$ is equal to the arcsine of the quotient of the width of the baluster 11 divided by the length of the side arm 15. Recalling that the optimal angle $\alpha$ is equal to the arccosine of the same quotient, it follows that the angles $\alpha$ and $\theta$ are complementary (i.e., $\sin\theta=\cos[90°-\theta]$). Consequently, the optimal angle $\theta$ is the complement of the angle a (i.e., $\theta=90°-\alpha$).

When the bracket 10 is mounted on the baluster 11, the locking arm 17 diagonally traverses and engages part of the remaining side face of the baluster 11. In the preferred embodiment, as shown in FIGS. 1 and 2, the locking arm 17 has an obtuse inward bend 24 in its midsection, by which it engages the side of the baluster snugly. In this configuration, the free end 25 of the locking arm 17 extends outward away from the side of the baluster 11, so that the free end 25 may be grasped when the user wishes to adjust the hanging height of the bracket 10.

As shown in FIG. 4, the bracket 10 is mounted on the baluster 11 by tilting it upward so that the locking arm 17 is vertically oriented. The bracket 10 is placed on the baluster 11 such that the front, side and back arms (14–16) engage three faces of the baluster 11 and the locking arm 17 is vertically aligned along the back edge of the remaining face. The bracket 10 is then tilted downward until the support 13 is horizontally oriented (as shown in FIG. 3), and the locking arm 17 snugly engages the side face of baluster 11. When a potted plant (not shown) is placed in the support 13, the distribution of the load through the cantilever arm 12, combined with the frictional force of the other four arms of the bracket (14–16) engaging the four faces of the baluster 11, holds the support 13 securely in the horizontal position. The bracket 10 can be removed from the baluster 11 by reversing the foregoing procedure, that is, again tilting the bracket 10 upward until the locking arm 17 reaches the vertical position, and then sliding the bracket 10 out and away from the baluster 11.

The baluster bracket may be fabricated from any durable metal or plastic material. Since the bracket will be exposed to moisture and the elements, a rust-resistant material is preferred.

The present invention therefore effectively answers the need for a bracket capable of supporting a simple flower pot in a horizontal upright position from a deck or stairway baluster, while at the same time being readily detachable and readily adjustable as to hanging height.

While the present invention has been described is some detail with reference to certain currently preferred embodiments, other embodiments are feasible and will readily suggest themselves to those skilled in the art. Therefore, the spirit and scope of the appended claims are not limited to the description of the preferred embodiment contained herein.

What is claimed is:

1. A bracket suitable for horizontally supporting a flower pot from a baluster, comprising:

(a) a vertical baluster of the type typically found on outdoor decks and stairways, (b) a cantilever arm which extends horizontally outward from the baluster when the bracket is mounted thereon, (c) a support which extends from the outward end of the cantilever arm such that, when the bracket is mounted on the baluster, the support is horizontally oriented, thereby enabling it to support a flower pot in an upright position, (d) a front arm which extends perpendicularly from the inward end of the cantilever arm such that, when the bracket is mounted on the baluster, the front arm is horizontally oriented and engages the front face of the baluster across its entire width, (e) a side arm which extends perpendicularly from the end of the front arm such that, when the bracket is mounted on the baluster, the side arm is oriented upward at an acute angle $\alpha$ with respect to the horizontal and engages one of the side faces of the baluster along its entire width, (f) a back arm which extends perpendicularly from the end of the side arm such that, when the bracket is mounted on the baluster, the back arm is horizontally oriented and engages the back face of the baluster across its entire width, (g) a locking arm which extends perpendicularly from the end of the back arm such that, when the bracket is mounted on the baluster, the locking arm is oriented upward at an acute angle $\theta$ with respect to the plane defined by the side arm and the back arm, and the locking arm engages the remaining side face of the baluster along its entire part of its width.

2. The bracket according to claim 1, wherein the acute angle a at which the side arm extends upward from the horizontal plane defined by the cantilever arm and the front arm is equal to the arccosine of the quotient of the width of the baluster divided by the length of the side arm, such that when the bracket is mounted on the baluster and the side arm is oriented at said acute angle to the horizontal, the cantilever arm and the support are oriented in a horizontal plane, thereby allowing a flower pot to be supported in an upright position.

3. The bracket according to claim 2, wherein the side arm is longer than the front arm, the lengths of both the side arm and the front arm are greater than the width of the baluster, and the length of the back arm, measured along its interior side, is equal to the width of the baluster, such that the locking arm engages snugly against the side of the baluster when the bracket is mounted thereon.

4. The bracket according to claim 3, wherein the acute angle a at which the side arm extends upward from the horizontal plane defined by the cantilever arm and the front arm is less than 45°, and the acute angle $\theta$ at which the locking arm extends upward from the plane determined by the side arm and the back arm is equal to the complement of the acute angle $\alpha$, such that when the bracket is tilted upward with the locking arm oriented vertically, the aperture between the locking arm and the front arm is just wide enough to accommodate the baluster, thus allowing the bracket to be mounted thereon.

5. The bracket according to claim 4, wherein the locking arm has an obtuse inward bend in its midsection, such that its midsection engages the side of the baluster snugly and its free end extends away from the side of the baluster, allowing the free end of the locking arm to be grasped and manipulated in adjusting the height at which the bracket hangs from the baluster.

6. The bracket according to any one of claims 1–5, wherein the support is in the shape of a ring with an opening, said ring being oriented in the horizontal plane defined by the cantilever arm and the front arm, such that a flower pot having a rim diameter slightly greater than that of the ring will rest securely in an upright position in the support.

7. The bracket according to claim 6, wherein the centerline of the ring is aligned with the midpoint of the back arm, such that a flower pot seated in the ring is aligned with the centerline of the baluster.

* * * * *